Figure 1:
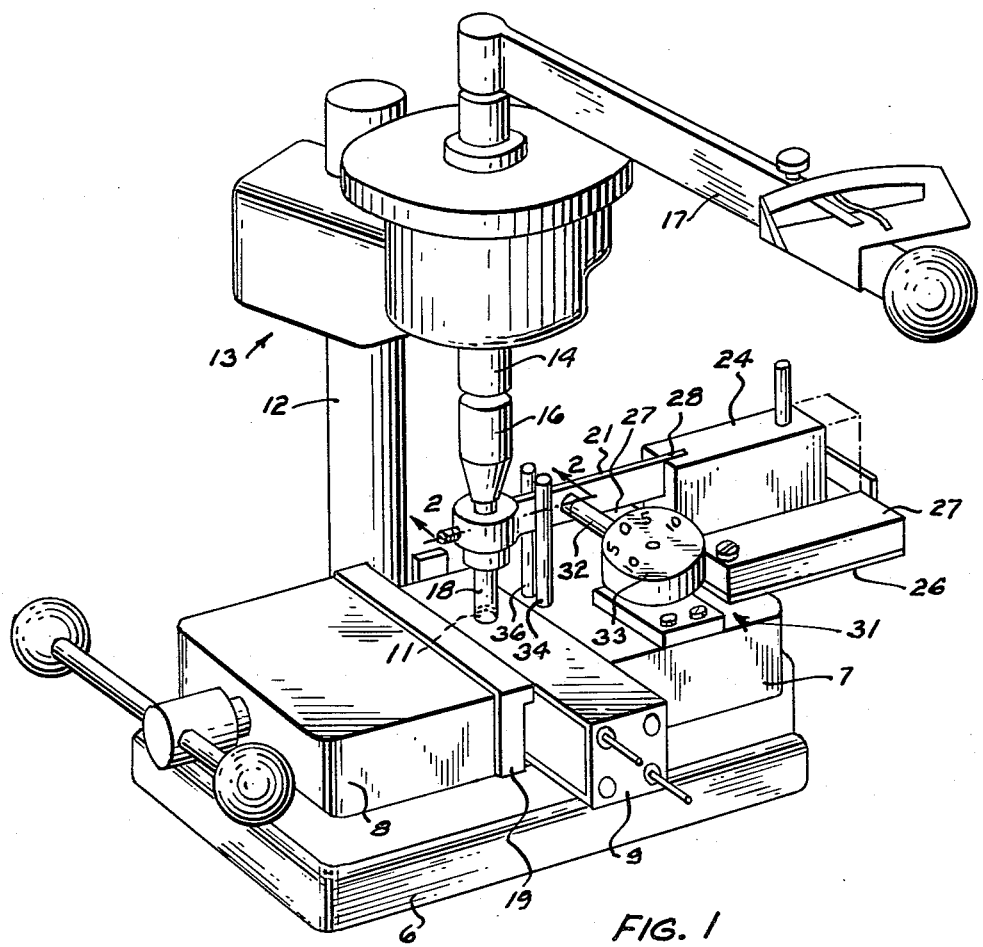

May 7, 1963    R. D. BERG    3,088,313
TORQUE TESTING APPARATUS
Filed Sept. 15, 1960

INVENTOR
R. D. BERG
BY
ATTORNEY

United States Patent Office 3,088,313
Patented May 7, 1963

3,088,313
TORQUE TESTING APPARATUS
Richard D. Berg, Elmhurst, Ill., assignor to Western Electric Company, Incorporated, a corporation of New York
Filed Sept. 15, 1960, Ser. No. 56,210
7 Claims. (Cl. 73—139)

This invention relates to torque testing fixtures, and more particularly to an apparatus for determining whether or not a threaded member has been properly tightened to a desired extent.

It is standard practice in the assembly of certain piece parts in which threaded members are tightened to a desired extent with a torque tool, to periodically spot-check the degree to which the threaded members are being tightened. Such a procedure is necessary since if for some reason the torque tool is not tightening the members sufficiently, they may later work loose and drop out, causing operating failures. In one type of torque testing fixture utilized for testing these threaded members in the past, a piece part was clamped in a vise forming a part of the fixture and a torque of a desired magnitude was applied to the member under test, with any movement of the member due to improper tightening being observed visually by the operator. This procedure was undesirable and inaccurate due to the inability of the operator to ascertain whether or not the member had actually moved. In this regard, other known devices are not sensitive enough to give this information, especially where extremely small movements are involved.

An object of this invention is to provide a new and improved torque testing apparatus.

Another object of this invention is to provide a new and improved torque testing apparatus for determining readily whether a threaded member has been properly tightened to a desired extent.

A further object of this invention is to provide a new and improved torque testing apparatus which is extremely sensitive and accurate as compared to prior known devices.

A still further object of this invention is to provide new and improved mechanism for ascertaining movement of a threaded member in a torque testing apparatus to determine whether the member has been tightened to a desired extent.

With these and other objects in view, the present invention contemplates a torque testing apparatus wherein a piece part, including a threaded member to be tested, is clamped in a vise and a torque of a desired magnitude is applied to the member by a rotatble bit of a torque unit. An elongated arm is releasably connected to the bit and extends outward therefrom into operating engagement with a dial actuating rod of a gage. Retractable means are provided for holding the arm in engagement with the dial actuating rod and to allow rotation of the bit relative to the arm so that surfaces of the bit and the threaded member can be aligned and brought into bearing engagement for applying torque to the member. An initial torque is then applied to the threaded member to take up any slack and an initial "zero" reading is obtained on the gage. When the retractable holding member is withdrawn and additional torque is applied to the threaded member, any rotary movement of the threaded member prior to the desired torque being applied, indicating that the threaded member is not properly tightened, is accurately indicated on the gage.

Figure 2:
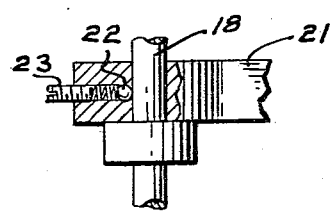

Other objects, advantages and novel features of the invention will become apparent upon consideration of the following detailed description in conjunction with the accompanying drawing wherein:

FIG. 1 is a perspective view of a torque testing fixture illustrating the present invention; and FIG. 2 is a cross-sectional enlarged view taken along the line 2—2 of FIG. 1.

Referring to the drawing, that portion of the illustrated apparatus comprising the basic fixture is known in the art as a Sturtevant torque testing fixture. It includes a base 6 which supports a vise having a fixed jaw 7 and a movable jaw 8 for securing a piece part 9, including an assembly screw 11 to be tested, in a fixed position as shown.

Upstanding from the base 6 and clamped thereto is a vertical post 12 which supports a torque applying unit 13 at its upper end. The torque unit includes a rotatable and vertically movable shaft 14 having a bit holder 16 at its lower end and an operating handle 17 at its upper end. The bit holder 16 has a suitable bit, such as a screwdriver bit 18, mounted therein. The shaft 14, bit holder 16 and handle 17 are movable vertically as a unit by suitable mechanism (not shown) whereby the bit 18 may be moved downward and then turned clockwise, as viewed in the drawing, by means of the handle 17 to apply torque to the screw 11. The torque unit is of the type which may be set to a torque of a preselected magnitude, and upon this torque being reached an audible or other type signal is actuated.

The foregoing structure is conventional in nature, its construction and manner of operation is believed to be apparent, and further discussion is not considered necessary.

Referring to the vise jaws 7, 8, since the piece part 9 may not be symmetrical about its longitudinal axis, if the part is clamped directly between the vise jaws there may be a tendency for the jaws to cause twisting of the part and the production of forces on the screw 11 which would not be present when the part is in an unclamped state, thus affecting the accuracy of the test resutls. Therefore, the movable vise jaw 8 is provided with an inverted substantially L-shaped gripping jaw face 19 having a rib extending longitudinally thereof for engaging the part 9 only along its upper edge as shown in the drawing, and cooperating with the fixed vise member 7 so as to secure the part in position without producing any appreciable twisting thereof.

The bit 18 is received through an aperture in the enlarged end of an elongated arm 21 which extends substantially transversely of the longitudinal vertical axis of the bit so as to have an outer free end. The arm 21 is connected to the bit by a suitable friction-type locking means, such as a spring urged element 22 (FIG. 2) including an adjusting screw 23. Thus the arm 21, if unrestricted, will move vertically and rotate with the bit, or may be held against movement with the bit, as desired.

Adjacent the outer free end of the arm 21 is a slide 24 which is movable between an advanced position, as shown in the drawing by solid lines, and a retracted position, as shown by dotted lines. The slide is positioned in a groove formed by a bottom plate 26 and a pair of spaced parallel members 27, the plate 26 and members 27 being secured to the fixed vise jaw 7 in a conventional manner, as by screws.

When the slide 24 is in an advanced position, the outer free end of the arm 21 is received in a slot 28 formed in the slide. This allows the bit 18 to be rotated relative to the arm against the action of the spring urged element 22 for aligning surfaces of the bit with surfaces of a slot in the screw, thereby to permit movement of the bit vertically downward into engagement with the screw for applying torque thereto. Further, with the arm 21 held by the slide 24, an initial torque can be applied to the screw to take up any slack in the parts of the apparatus and between the bit and the screw, and an initial "zero" reading can be taken on a gage 31, subsequently to be described. When the slide is moved to its retracted position, the outer free end of the arm 21 disengages from the slot 28 and the arm is free to rotate with the bit.

The gage 31 is mounted on the fixed jaw 7 and has a dial actuating rod 32 which extends substantially perpendicular to the longitudinal axis of the arm 21 into engagement therewith, as shown, whereby any rotary movement of the screw 11 by the bit 18 during a test operation will be indicated on a dial 33 by reason of the arm 21 imparting movement to the rod 32. The dial 33 is preferably calibrated to indicate rotary movement of the screw 11 in chord units of thousandths of an inch. Excessive movement of the arm which might damage the gage is prevented by a limiting pin 34 upstanding from the fixed jaw member 7. Movement of the arm in a reverse direction is precluded by a similar limit pin 36.

In operation, the piece part 9 is first properly positioned and clamped in the vise jaws 7, 8 and the torque unit 13 is set to the torque to which the screw 11 was to have been tightened during the assembly operation. With the slide 24 in its advanced position and the outer free end of the arm 21 in the slot 28 so that the arm is engaged with the dial actuating rod 32, the bit 18 is moved into engagement with the screw 11, an initial torque is applied to the screw to take up slack, and an initial "zero" reading is taken on the dial 33. The slide is then retracted and additional torque of progressively increasing magnitude is applied to the screw until the desired torque is reached. Any movement of the screw, showing improper tightening, will be indicated on the dial 33, while lack of screw movement will indicate that the screw has been tightened to the desired extent.

From the foregoing description, it is apparent that a new and improved device has been provided which obviously accomplishes the desired objects. The spring urged element 22 and the reciprocating slide 24 provide a construction whereby the rotatable bit 18 readily can be rotated relative to the arm 21 into proper alignment with the slot of the screw 11, and then be moved vertically downward into the slot for applying torque to the screw. The slide also operates to hold the arm in engagement with the dial actuating rod 32, allowing an initial torque to be applied to the screw to take up slack and a "zero" reading to be obtained on the dial 33, whereby the accuracy of the test results is increased. Further, the slide readily can be retracted whereupon additional torque can be applied to the screw 11, with any rotary movement of the screw being substantially magnified by means of the elongated arm 21 and readily ascertainable on the dial 33.

It is contemplated that torque testing devices other than the specific type shown in the drawing could be modified in accordance with the principles of the invention as set forth above, and it is to be understood that the above-described arrangements are simply illustrative of the application of these principles. Numerous other arrangments may be readily devised by those skilled in the art which will embody the principles of the invention and fall within the spirit and scope thereof.

What is claimed is:

1. Apparatus for determining whether a threaded member has been tightened to a desired extent, which comprises torque applying means including a rotatable bit for applying torque of a desired magnitude to the member, an arm, locking means for connecting said arm to said rotatable bit for rotation therewith, and gage means engageable with and operable by said arm for indicating any rotary movement of the member by said bit, said bit and said arm remaining stationary as said bit applies torque of the desired magnitude to the member, if the member is tightened to the desired extent, and said bit being operative to rotate the member as said bit applies torque of the desired magnitude to the member, if the member is not tightened to the desired extent, so that said arm moves to operate said gage.

2. Apparatus for determining whether a threaded member has been tightened to a desired extent, which comprises torque applying means including a rotatable bit for applying torque of a desired magnitude to the member, an arm, locking means for connecting said arm to said bit for rotation therewith, said locking means being operative to permit rotation of said bit relative to said arm for bringing surfaces of said bit and of the member firmly into torque transmitting engagement, and gage means engageable with and operable by said arm for indicating any rotary movement of the member by said bit, said bit and said arm remaining stationary as said bit applies torque of the desired magnitude to the member, if the member is tightened to the desired extent, and said bit being operative to rotate the member as said bit applies torque of the desired magnitude to the member, if the member is not tightened to the desired extent, so that said arm moves to operate said gage.

3. Apparatus for determining whether a threaded member has been tightened to a desired extent, which comprises torque applying means including a rotatable bit for applying torque of a desired magnitude to the member, an arm extending substantially transverserly of the longitudinal axis of said rotatable bit and having an aperture formed in one end thereof for receiving said rotatable bit therethrough, locking means for connecting said arm to said rotatable bit for rotation therewith, and a gage having a gage rod which extends substantially perpendicular to the longitudinal axis of said arm into engagement with said arm for indicating any rotary movement of the member by said bit, said bit and said arm remaining stationary as said bit applies torque of the desired magnitude to the member, if the member is tightened to the desired extent, and said bit being operative to rotate the member as said bit applies torque of the desired magnitude to the member, if the member is not tightened to the desired extent, so that said arm moves to operate said gage.

4. Apparatus for determining whether a threaded member has been tightened to a desired extent, which comprises a rotatable bit for applying torque of a desired magnitude to the member, an arm, friction-type locking means connecting said arm to said rotatable bit for rotation therewith, retractable means for engaging and holding said arm against the action of said friction-type locking means whereby said bit is rotatable relative to said arm for bringing surfaces of said bit and of the member firmly into torque transmitting engagement, said retractable means being movable out of engagement with said arm whereby said arm is free to rotate with said bit while torque is being applied to the member, and gage means engageable with and operable by said arm for indicating any rotary movement of the member by said bit as said bit applies torque of the desired magnitude to the member.

5. Apparatus for determining whether a threaded member has been tightened to a desired extent, which comprises a rotatable bit for applying torque of a desired magnitude to the member, an arm extending substantially transversely of the longitudinal axis of said bit, friction-type locking means connecting said arm to said bit for rotation therewith, a reciprocating member movable between advanced and retracted positions and having a slot formed therein, said arm being receivable in the slot of said reciprocating member when said reciprocating member is in its advanced position whereby said arm is held against the action of said friction-type locking means and said bit is rotatable relative to said arm for bringing surfaces of said bit and of the threaded member firmly into torque transmitting engagement, said arm being disengaged from the slot of said reciprocating member when said reciprocating member is in its retracted position whereby said arm is free to rotate with said bit while torque is being applied to the threaded member, and a gage having a gage rod which extends substantially perpendicular to the longitudinal axis of said arm into engagement with said arm for indicating any rotary movement of the threaded member by said bit as said bit applies torque of the desired magnitude to the member.

6. Apparatus for determining whether a threaded member in a piece part has been tightened to a desired extent, which comprises a vise including a pair of clamping jaws movable relative to one another for securing the piece part in position, a rotatable bit for applying torque of a desired magnitude to the member, an arm extending substantially transversely of the longitudinal axis of said bit and having an aperture formed in one end thereof for receiving said bit therethrough, friction-type locking means connecting said arm to said bit for rotation therewith, a reciprocating member movable between advanced and retracted positions, said reciprocating member in its advanced position being engageable with said arm for holding said arm against the action of said friction-type locking means whereby said bit is rotatable relative to said arm for bringing surfaces of said bit and of the threaded member firmly into torque transmitting engagement, said reciprocating member in its retracted position being disengaged from said arm whereby said arm is free to rotate with said bit while torque is being applied to the threaded member, and a gage having a gage rod which extends substantially perpendicular to the longitudinal axis of said arm into engagement with said arm for indicating any rotary movement of the threaded member by said bit as said bit applies torque of the desired magnitude of the threaded member.

7. A torque testing fixture for determining whether a threaded member in a piece part has been tightened to a desired extent, which comprises a fixed jaw and a movable jaw, one of said jaws including a gripping member having a laterally projecting rib engageable along an edge of the piece part adjacent the threaded member and cooperating with the other of said jaws for securing the piece part in position, a rotatable bit movable into engagement with the threaded member for applying torque of a desired magnitude thereto, an elongated arm extending substantially transversely of the longitudinal axis of said rotatable bit and having an outer free end, said arm being enlarged at its other end and having an aperture formed therethrough for receiving said bit, spring-biased locking means extending through the enlarged end of said arm into engagement with said bit for connecting said arm to said bit, a pair of spaced members mounted on said fixed jaw and forming a groove extending substantially parallel to the longitudinal axis of said arm, a slide movable in the groove formed by said spaced members between advanced and retracted positions, said slide having a slot formed therein for receiving the outer free end of said arm when said slide is in its advanced position whereby said arm is held against the action of said spring biased locking means and said bit is rotatable relative to said arm for bringing surfaces of said bit and of the member firmly into torque transmitting engagement, the outer free end of said arm being disengaged from the slot in said slide when said slide is in its retracted position, whereby said arm is free to rotate with said bit while torque is being applied to the member, a gage mounted on said fixed jaw and including a gage rod extending substantially perpendicular to the longitudinal axis of said arm into engagement with said arm at a point intermediate the ends thereof for indicating any rotary movement of the member by said bit as said bit applies torque of the desired magnitude to the member, and limiting means on said fixed jaw on each side of said arm.

References Cited in the file of this patent
UNITED STATES PATENTS

| | | |
|---|---|---|
| 2,183,633 | Zimmerman | Dec. 19, 1939 |
| 2,374,217 | Larson et al. | Apr. 24, 1945 |
| 2,394,022 | Storrie | Feb. 5, 1946 |
| 2,429,517 | Knapp | Oct. 21, 1947 |
| 3,011,332 | Skidmore | Dec. 5, 1961 |